(12) United States Patent
Taniguchi et al.

(10) Patent No.: US 9,283,880 B2
(45) Date of Patent: Mar. 15, 2016

(54) VEHICLE SEATS AND MANUFACTURING METHODS THEREOF

(71) Applicant: TOYOTA BOSHOKU KABUSHIKI KAISHA, Aichi-ken (JP)

(72) Inventors: Mitsuaki Taniguchi, Aichi-ken (JP); Yukihiro Nishimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 73 days.

(21) Appl. No.: 14/017,475

(22) Filed: Sep. 4, 2013

(65) Prior Publication Data

US 2014/0070595 A1 Mar. 13, 2014

(30) Foreign Application Priority Data

Sep. 13, 2012 (JP) ................................. 2012-201154

(51) Int. Cl.
| | |
|---|---|
| *B29C 44/12* | (2006.01) |
| *B60N 2/58* | (2006.01) |
| *B60N 2/64* | (2006.01) |

(Continued)

(52) U.S. Cl.
CPC ............. *B60N 2/58* (2013.01); *B29C 37/0032* (2013.01); *B29C 37/0082* (2013.01); *B29C 44/12* (2013.01); *B60N 2/5816* (2013.01); *B60N 2/5891* (2013.01); *B60N 2/64* (2013.01); *B60N 2/7017* (2013.01); *B60R 21/207* (2013.01); *B29C 2037/0042* (2013.01); *B60N 2002/5808* (2013.01)

(58) Field of Classification Search
CPC ...... B60N 2/4235; B60N 2/4214; B60N 2/42; B60N 2/5891

USPC ................ 297/216.1, 216.13, 452.48, 452.58
See application file for complete search history.

(56) References Cited

U.S. PATENT DOCUMENTS

| | | | |
|---|---|---|---|
| 5,810,389 A | 9/1998 | Yamaji et al. | |
| 5,975,567 A * | 11/1999 | Higashiura | ................ 280/730.2 |

(Continued)

FOREIGN PATENT DOCUMENTS

| | | |
|---|---|---|
| DE | 3939301 | 5/1990 |
| DE | 69601699 | 10/1999 |

(Continued)

OTHER PUBLICATIONS

German Office action dated is Mar. 11, 2014.

(Continued)

*Primary Examiner* — David R Dunn
*Assistant Examiner* — Timothy J Brindley
(74) *Attorney, Agent, or Firm* — Greenblum & Bernstein, P.L.C.

(57) ABSTRACT

Embodiments of the present invention may include a vehicle seat having a cushion pad, a seat skin, webbing, and a retaining structure. The cushion pad is configured to cover a seat frame and to be attached to the seat frame. The seat skin is configured to cover the cushion pad. The seat skin is provided with a developing portion to be developed by a developing force of an airbag. The webbing is connected to the seat skin so as to transmit the developing force of the airbag to the developing portion. A fastener is provided at a fixation portion of the webbing. The fastener is fastened to the seat frame. The retaining structure retains the fastener at a predetermined position with respect to a back surface of the cushion pad in a state prior to the fastening the fastener to the seat frame.

10 Claims, 8 Drawing Sheets

(51) Int. Cl.
　　*B60N 2/70*　　　(2006.01)
　　*B60R 21/207*　 (2006.01)
　　*B29C 37/00*　　(2006.01)

(56) References Cited

U.S. PATENT DOCUMENTS

| | | | |
|---|---|---|---|
| 6,003,939 A * | 12/1999 | Nakai et al. | 297/216.13 |
| 6,045,151 A * | 4/2000 | Wu | 280/728.3 |
| 6,074,003 A * | 6/2000 | Umezawa et al. | 297/216.1 |
| 6,213,550 B1 * | 4/2001 | Yoshida et al. | 297/216.13 |
| 6,612,610 B1 * | 9/2003 | Aoki et al. | 280/730.2 |
| 7,481,489 B2 | 1/2009 | Demick | |
| 7,540,529 B2 * | 6/2009 | Tracht et al. | 280/730.2 |
| 7,942,477 B1 * | 5/2011 | Toba et al. | 297/180.12 |
| 8,177,256 B2 * | 5/2012 | Smith et al. | 280/730.2 |
| 8,439,394 B2 * | 5/2013 | Tracht | 280/728.3 |
| 8,562,017 B2 | 10/2013 | Oga et al. | |
| 8,573,635 B2 * | 11/2013 | Festag et al. | 280/730.2 |
| 8,752,863 B2 * | 6/2014 | Festag et al. | 280/730.2 |
| 8,820,780 B2 * | 9/2014 | Thomas | 280/730.2 |
| 8,833,852 B2 * | 9/2014 | Festag | 297/216.13 |
| 2007/0145727 A1 * | 6/2007 | Inoue et al. | 280/730.2 |
| 2008/0136237 A1 * | 6/2008 | Kayumi et al. | 297/284.9 |
| 2008/0224509 A1 | 9/2008 | Demick | |
| 2009/0001783 A1 * | 1/2009 | Hazlewood et al. | 297/216.1 |
| 2009/0026814 A1 * | 1/2009 | Kim et al. | 297/216.1 |
| 2010/0140905 A1 * | 6/2010 | Kim et al. | 280/730.2 |
| 2011/0140396 A1 | 6/2011 | Urabe et al. | |
| 2013/0147243 A1 * | 6/2013 | Lee et al. | 297/216.13 |
| 2013/0187416 A1 * | 7/2013 | Nakata | 297/216.13 |
| 2013/0200664 A1 * | 8/2013 | Patterson et al. | 297/216.1 |
| 2013/0320743 A1 * | 12/2013 | Sakamoto | 297/452.48 |
| 2013/0320744 A1 * | 12/2013 | Sakamoto | 297/452.58 |
| 2014/0070594 A1 * | 3/2014 | Awata et al. | 297/452.48 |
| 2014/0070595 A1 * | 3/2014 | Taniguchi et al. | 297/452.59 |
| 2014/0167465 A1 * | 6/2014 | Sakata et al. | 297/284.11 |
| 2014/0312664 A1 * | 10/2014 | Tanabe et al. | 297/216.13 |

FOREIGN PATENT DOCUMENTS

| | | |
|---|---|---|
| DE | 102008014061 | 10/2008 |
| EP | 0782944 | 3/1999 |
| GB | 2225279 | 5/1990 |
| JP | 2011-121511 | 6/2011 |

OTHER PUBLICATIONS

Chinese Office Action for CN App. No. 201310418548.3 dated Jul. 2, 2015, along with an English-language translation thereof.

* cited by examiner

VEHICLE SEATS AND MANUFACTURING METHODS THEREOF

This application claims priority to Japanese patent application serial number 2012-201154, the contents of which are incorporated herein by reference.

BACKGROUND OF THE INVENTION

1. Field of the Invention

Embodiments of the present invention relate to vehicle seats.

2. Description of the Related Art

A vehicle seat equipped with a side airbag generally has webbing. The webbing may transmit developing force of the airbag to a developing portion of a seat skin. A tip end portion of the webbing is sewn on the developing portion of the seat skin. A distal end portion of the webbing is fixed to the seat frame via a fastener (see Japanese Laid-Open Patent Publication No. 2011-121511).

A manufacturing process of the vehicle seat equipped with the side airbag includes a step of covering the seat frame with the seat skin and the cushion pad. During this step, the fastener, which is fixed to the webbing, moves in an irregular fashion on the back side of the cushion pad. As a result, the above-mentioned step is rather difficult to perform.

Therefore, there is a need in the art for a vehicle seat which easily allows a seat frame to be covered with a seat skin and a cushion pad.

SUMMARY OF THE INVENTION

According to an aspect of the invention, certain embodiments of the present invention include a vehicle seat having a cushion pad, a seat skin, webbing, and a retaining structure. The cushion pad is configured to cover a seat frame to be attached to the seat frame. The seat skin is configured to cover the cushion pad. The seat skin is provided with a developing portion to be developed by a developing force of an airbag. The webbing is connected to the seat skin so as to transmit the developing force of the airbag to the developing portion. A fastener is provided at a fixation portion of the webbing. The fastener is fastened to the seat frame. The retaining structure retains the fastener at a predetermined position with respect to a back surface of the cushion pad in a state prior to the fastening of the fastener to the seat frame.

In a manufacturing process of the vehicle seat, the seat frame is covered with the seat skin and the cushion pad. At this time, the retaining structure may retain the fastener at a predetermined position. The retaining structure may prevent the fastener from moving irregularly with respect to the back surface of the cushion pad. Thus, when fastening the fastener to the seat frame, it is possible for a worker to immediately notice the position of the fastener and easily grasp the fastener. As a result, the fastener can be easily fastened to the seat frame. Accordingly, the seat frame can be easily covered with the seat skin and the cushion pad.

According to another aspect of the invention, the retaining structure may be integrally formed on the back surface of the cushion pad at a time of foaming the cushion pad. Thus, it is possible to form the retaining structure without having to perform any additional manufacturing step.

According to another aspect of the invention, a manufacturing method of a vehicle seat may comprise one or more of the following steps. A back surface member may be set in a mold for forming a cushion pad. A foam material is foamed in the mold to form the cushion pad. A part of the foam material is leaked through a slit formed in the back surface member to form the retaining structure. The retaining structure firmly attaches a connection portion between the webbing and a fastener to the cushion pad.

The retaining structure is formed during the foaming of the cushion pad. Thus, the fastener can be retained at a predetermined position with respect to the cushion pad without any additional manufacturing steps. The retaining structure firmly attaches the fastener to the cushion pad due to the foam material leaking through the slit of the back surface member. By forming the slit in an appropriate size, it is possible to adjust the amount of the foam material allowed to leak through the slit. Thus, it is possible to suitably adjust the force with which the connection portion between the webbing and the fastener is firmly attached to the cushion pad.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
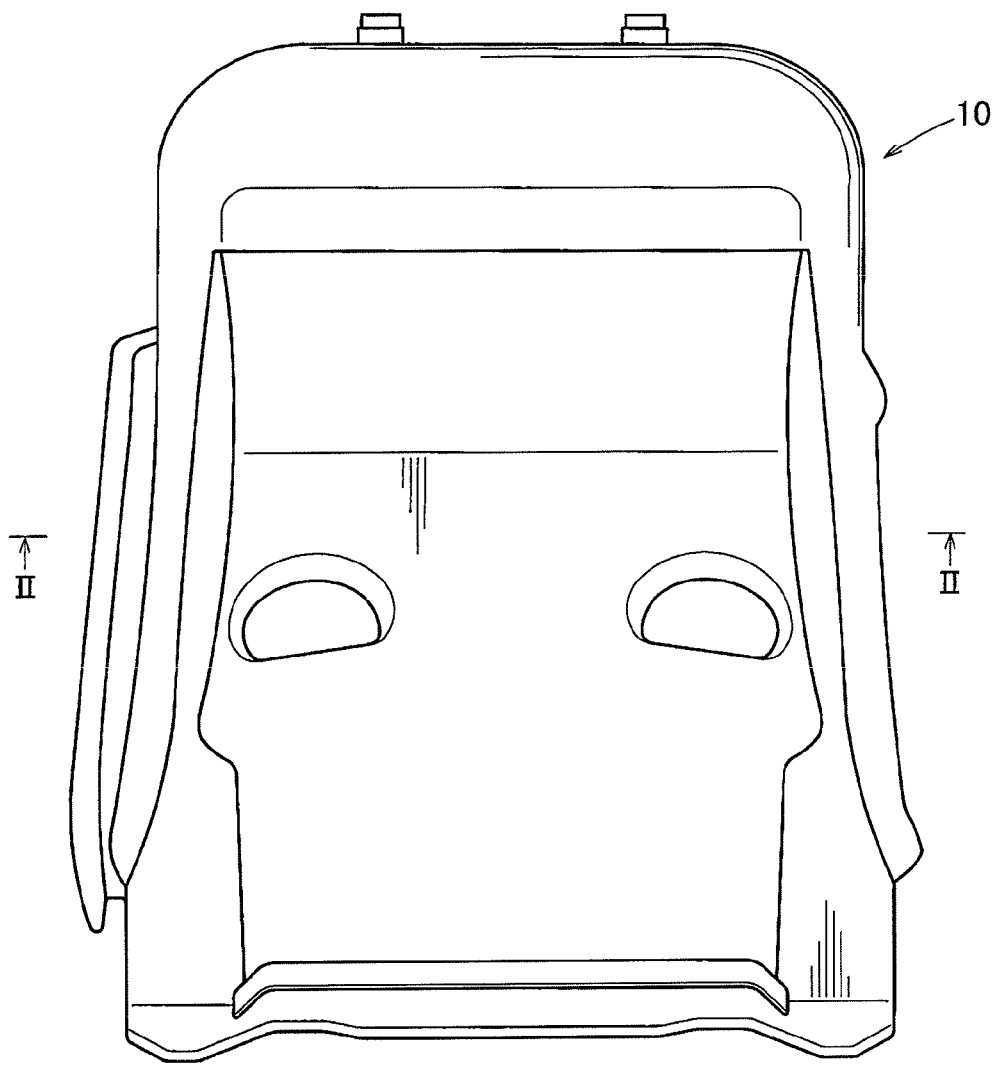
FIG. 1 is a rear view of a cushion pad assembly for a seat back of a vehicle seat according to an example of the present invention.
Figure 2:
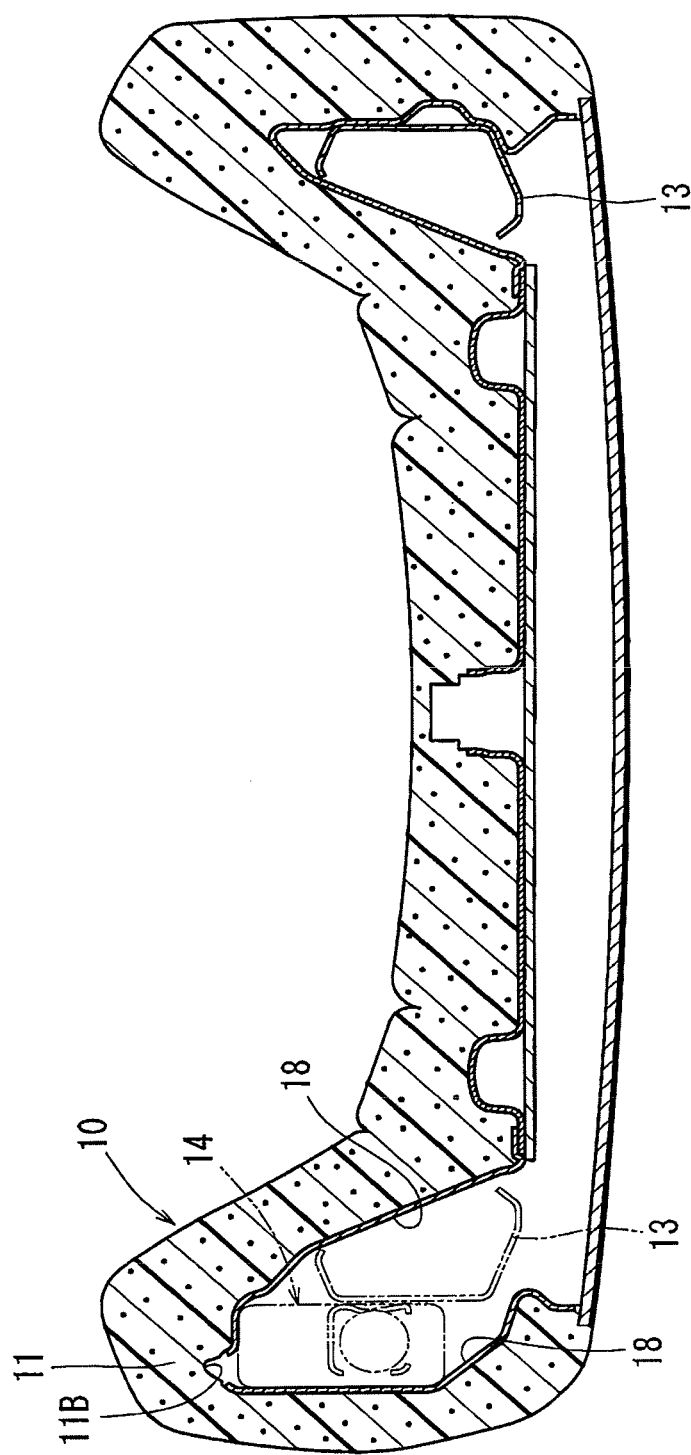
FIG. 2 is a cross-sectional view taken along line II-II in FIG. 1.
Figure 3:
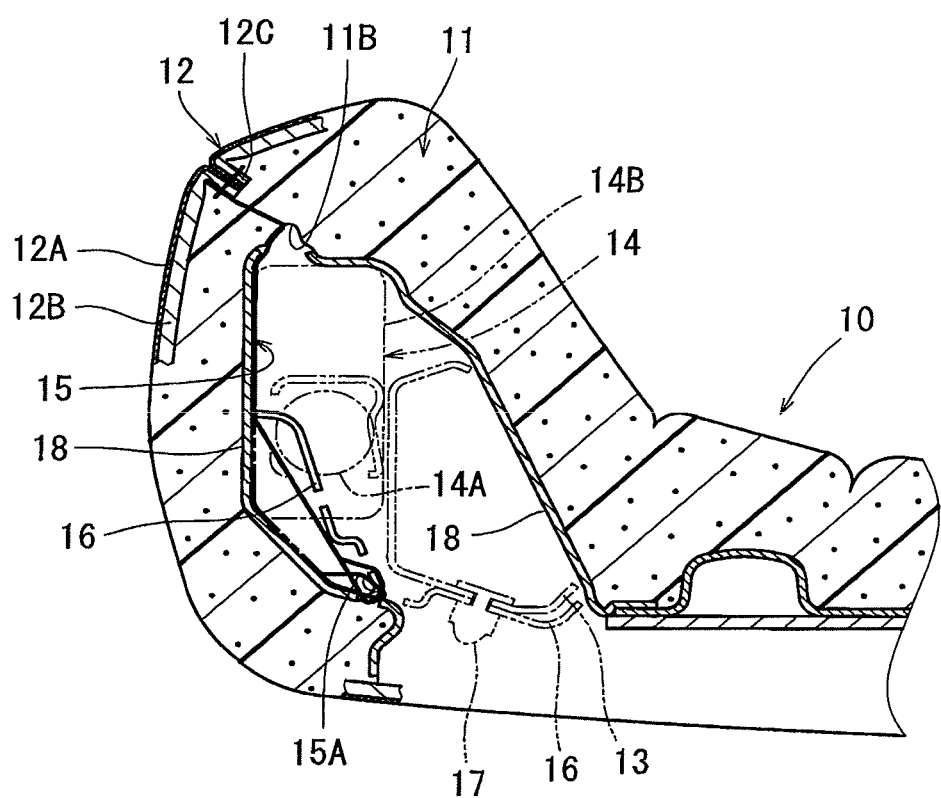
FIG. 3 is an enlarged view of a part of the FIG. 2.

FIGS. 1 to 3 illustrate a seat foam-molded with a skin. When manufacturing the seat, the skin is set in the mold for forming the cushion pad. The material of the cushion pad is poured into the mold, and is allowed to foam within the mold. As a result, the cushion pad is formed, and the skin is integrally attached to the surface of the cushion pad.

As shown in FIGS. 1 to 3, a cushion pad assembly 10 of the seat back has a cushion pad 11 and a seat skin 12. As shown in FIG. 3, the cushion pad 11 has a developing portion 11B allowing for the development of a side airbag. The seat skin 12 includes a skin material 12A, a skin pad 12B, and a sewing portion 12C. The sewing portion 12C is situated in correspondence with the developing portion 11B, and functions as a developing portion for allowing the development of the side airbag.

A back surface member 18 is firmly attached to a back surface of the cushion pad 11. The back surface member 18 is formed of a material obtained by mixing non-woven fabric with a binder in a configuration in conformity with the back surface configuration of the cushion pad 11. Like the seat skin 12, the back surface member 18 is integrated with the cushion pad 11 at the time of the foaming of the cushion pad 11.

The airbag has an airbag module 14. The airbag module 14 has an airbag unit 14A covered with a casing, and an airbag main body (not shown). The airbag module 14 is fixed to a seatback frame 13.

Webbing 15 is provided between the airbag module 14 and the back surface member 18. A tip end portion of the webbing 15 is sewn on the seat skin 12 at the sewing portion 12C of the seat skin 12. A connection portion 15A is provided at a distal end portion of the webbing 15. The connection portion 15A is formed by folding back the webbing 15 in a loop-like fashion. One end of a fastener (bracket) 16 is connected to the connection portion 15A. Like the seat skin material 12 and the back surface member 18, the webbing 15 is integrated with the cushion pad 11 at the time of the foaming of the cushion pad 11. As shown in FIG. 3, the webbing 15 may be provided solely on one side of the sewing portion 12C constituting the developing portion, or may be provide on both sides of the sewing portion 12C.

Figure 4:
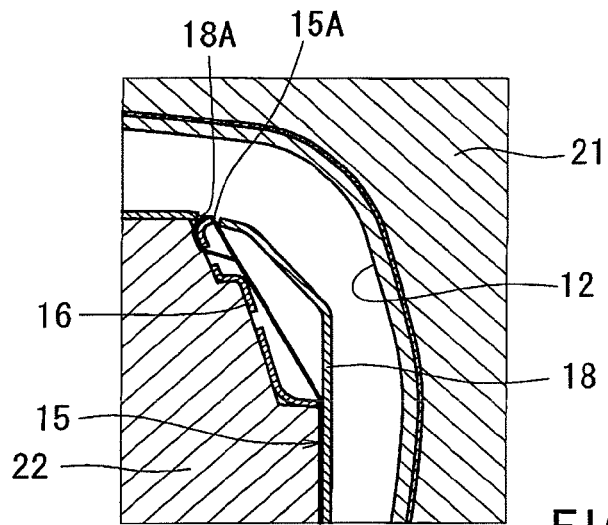
FIG. 4 is a front view of an inner pad of the disc brake.
Figure 5:
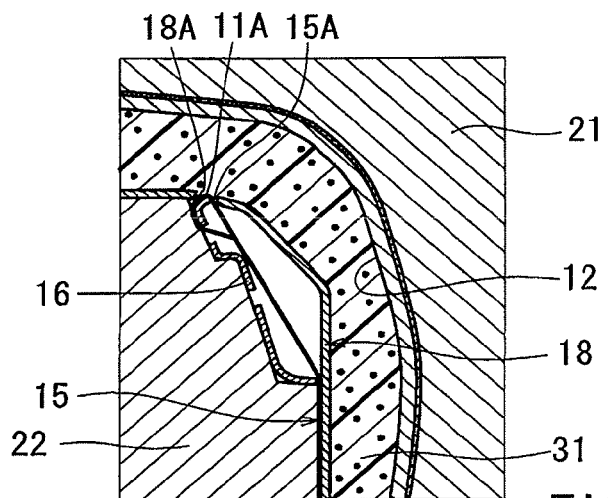
FIG. 5 is a view in a state before molding the cushion pad for explaining a manufacturing process of the cushion pad assembly.
Figure 6:
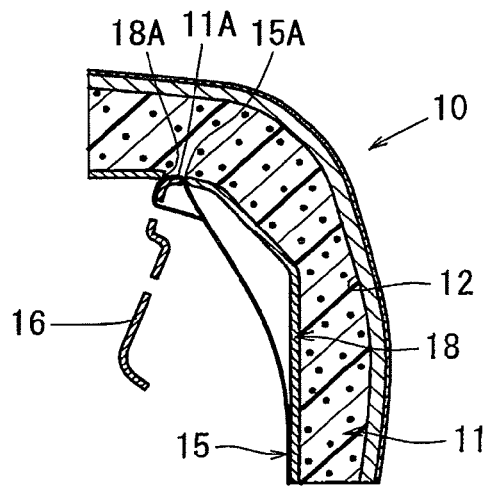
FIG. 6 is a view in a state after molding the cushion pad for explaining the manufacturing process of the cushion pad assembly.

As shown in FIGS. 4 to 6, the cushion pad 11 is formed by a mold 21. As shown in FIG. 4, the seat skin 12 is set on an inner surface of a first mold 21. The webbing 15 is set on an inner surface of a second mold 22, and the back surface member 18 is set on the webbing 15. The webbing 15 and the back surface member 18 are superimposed with one another. The fastener 16 connected to the connection portion 15A of the webbing 15 is set between the webbing 15 and the second mold 22. On the inner surface of the mold 22, there is formed a fit-engagement portion to be configured to receive the fastener 16. The fastener 16 is fitted into the fit-engagement portion. The webbing 15 and the connection portion 15A are arranged and superimposed on the fastener 16. The fit-engagement portion is preferably provided or embedded with a permanent magnet. Thus the fit-engagement portion is preferably magnetized. By utilizing magnetism, the fastener 16 can be set in the fit-engagement portion easily and securely.

A slit 18A is formed in the back surface member 18. The slit 18A is situated at a position corresponding to the connection portion 15A of the webbing 15. The slit 18A has a length corresponding to the width of the connection portion 15A of the webbing 15. As shown in FIG. 5, the width of the slit 18A is of a size allowing leakage of urethane foam 31. Thus, when foaming the cushion pad 11, the urethane foam 31 filling the molds 21 and 22 slightly leaks through the slit 18A to reach the connection portion 15A of the webbing 15. For example, when the width of the connection portion 15A of the webbing 15 is 40 mm, the length of the slit 18A is set to 20 mm, and the width of the slit 18A is set to 4 mm.

As shown in FIG. 5, the urethane foam 31 is foamed between the molds 21 and 22. The seat skin 12 is bonded to a front surface of the urethane foam 31. The back surface member 18 is bonded to a back surface of the urethane foam 31. A slight portion of the urethane foam 31 leaks throughout the slit 18A of the back surface member 18, and enters between the weaving yarns of the webbing 15 to become a fixation portion (retaining means, retaining structure, fixation end) 11A. The fixation portion 11A causes the connection portion 15A of the webbing 15 to be firmly attached to the cushion pad 11. The cushion pad assembly 10 is formed by the molds 21 and 22, and is extracted from the molds 21 and 22. As shown in FIG. 6, the fastener 16 is retained by the connection portion 15A of the webbing 15 due to the fixation portion 11A. The connection portion 15A restricts the fastener 16 from rotating freely.

As shown in FIG. 5, the fit-engagement portion of the mold 22 is of a configuration in conformity with the fastener 16. The back surface member 18 is of a configuration in conformity with the cushion pad 11. A space is formed between the fastener 16 and the back surface member 18. The back surface member 18, which is situated in the space, is not supported by the mold 22. The portion of the back surface member 18 corresponding to the fastener 16 is of a rigidity high enough to substantially prevent it from undergoing deformation when it receives pressure from the urethane foam 31 during the foaming of the urethane foam 31.

As described above, the connection portion 15A of the webbing 15 is situated at a position corresponding to the slit 18A of the back surface member 18. The connection portion 15A is retained by the fixation portion 11A of the cushion pad 11. The fixation portion 11A retains the fastener 16 with respect to the connection portion 15A and the cushion pad 11. The fixation portion 11A can suppress irregular or free movement of the fastener 16 on a back area of the cushion pad 11. Thus, when covering the seatback frame 13 with the cushion pad 11 and the seat skin 12 attached thereto during the vehicle seat manufacturing process, it is possible to suppress irregular or free movement of the fastener 16. Thus, the cushion pad 11 with the seat skin 12 attached thereto can be easily attached to the seatback frame 13. The fastener 16 is retained at a predetermined position. Thus, when fastening the fastener 16 to the seatback frame 13, a worker can immediately notice a position of the fastener 16. As a result, the worker can easily fasten the fastener 16 to the seatback frame 13.

When the seatback frame 13 has been covered with the cushion pad 11 with the seat skin 12 attached thereto, the webbing 15 and the fastener 16 are situated at the positions indicated by the solid lines in FIG. 3. The fastener 16 is rotated clockwise around the connection portion 15A of the webbing 15. At this time, the side portion of the cushion pad assembly 10 is opened for deformation so that the fastener 16 may not interfere with the seatback frame 13. The fastener 16 is moved to the position indicated by the two-dot chain line in FIG. 3, and is caused to extend along the seatback frame 13. The fastener 16 is fastened to the seatback frame 13 by a bolt 17. As a result, the fastener 16 is mounted to the seatback frame 13. After the fastener 16 has been fastened to the seatback frame 13, the connection portion 15A of the webbing 15 may or may not be separated from the cushion pad 11.

As described above, the fastener 16 is retained on the back surface of the cushion pad 11 by the connection portion 15A of the webbing 15 during the foaming of the cushion pad 11. Thus, it is possible to maintain the position of the fastener 16 with respect to the cushion pad 11 without having to perform any additional operation. The connection portion 15A is formed by the urethane foam 31 having entered between the weaving yarns of the webbing. The webbing is typically comprised of fabric. Thus, the connection portion 15A causes the fastener 16 to be attached to the cushion pad 11 firmly enough so as to prevent easy detachment when the seatback frame 13 is covered with the cushion pad 11 with the seat skin 12 attached thereto.

The connection portion 15A is formed by the urethane foam 31 allowed to leak out of the slit 18A of the back surface member 18. Thus, it is possible to adjust the amount of the urethane foam 31 allowed to leak out of the slit 18A according to the size of the slit 18A. As a result, it is possible for the connection force between the webbing 15 and the fastener 16 to be sufficiently large.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The above-described structure may be applied to the seatback of a vehicle seat, as well as a seat cushion.

The vehicle seat may or may not have the back surface member attached to the back surface of the cushion pad.

As described above, the retaining means may have the fixation portion 11A. Alternately, the retaining means may have a pocket for retaining the fastener. The pocket may be formed integrally on the back surface of the cushion pad. The pocket may be formed simultaneously with the foaming of the cushion pad. Alternatively, the retaining means may have an attachment for bonding the fastener to the cushion pad directly or indirectly. Alternatively, the retaining means have a hook and loop fastener provided at the connection portion between the webbing and the fastener, or on the fastener, with the hook and loop fastener capable of engaging the back surface member.

The back surface member 18, which constitutes the retaining means as described above, may have the slit 18A of a length corresponding to the width of the connection portion 15A. Alternatively, the back surface member 18 may have a plurality of holes provided at positions corresponding to the slit 18A. Alternatively, the back surface member 18 may have a region where a weaving-yarn interval is large enough to allow leakage of the urethane foam 31. The region is located at a portion corresponding to the slit 18A.

As described above, the seat skin may be integrated with the cushion pad at the time of formation of the cushion pad. Alternatively, the seat skin may be separate from the cushion pad, and the cushion pad formed through foaming may be covered with the seat skin.

Figure 7:
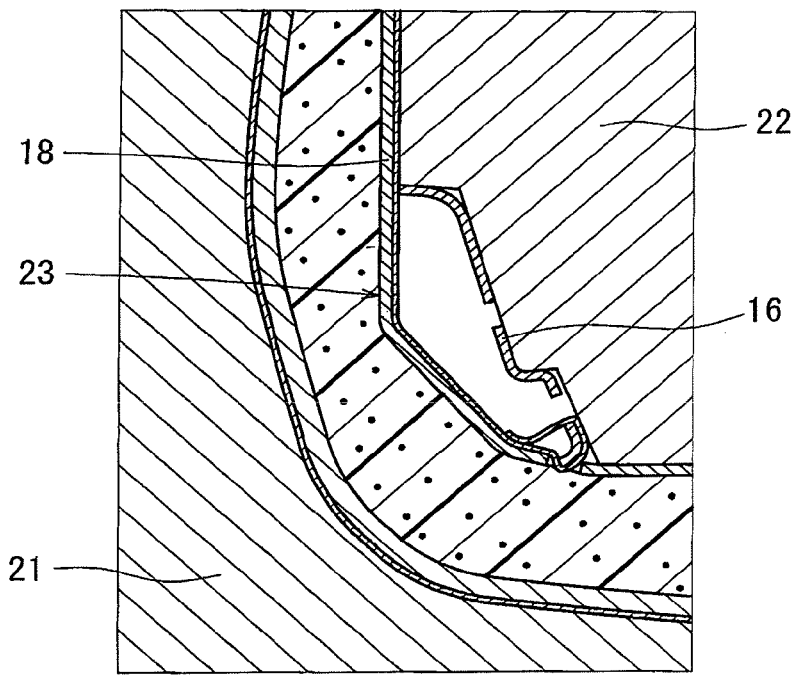
FIG. 7 is a view in a state after molding the cushion pad for explaining the manufacturing process of the cushion pad assembly with another webbing.

The cushion pad assembly 10 may have webbing 23 as shown in FIGS. 7 to 10 instead of the webbing 15 shown in FIGS. 3 to 6. The webbing 23 is longer than the webbing 15. As shown in FIG. 7, the webbing 23 is set along the back surface member 18 in the molds 21 and 22.

Figure 8:
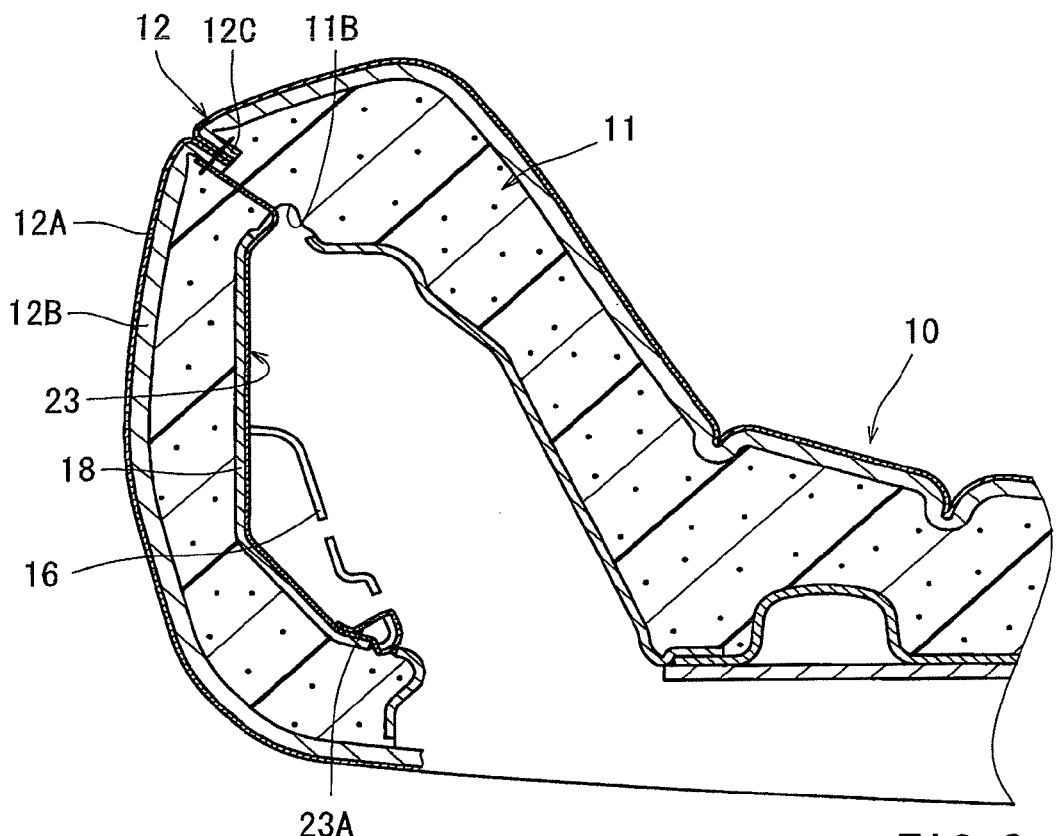
FIG. 8 is a cross-sectional view of the cushion pad assembly of FIG. 8 when a retaining structure retains a fastener.

As shown in FIG. 8, the webbing 23 extends along the back surface member 18 in a free state. The webbing 23 has a fixation portion 23A at a tip end thereof. The fixation portion 23A is connected with the fastener 16. A retaining structure detachably retains the fixation portion 23A. The retaining structure is formed of the foam material of the cushion pad 11.

Figure 9:
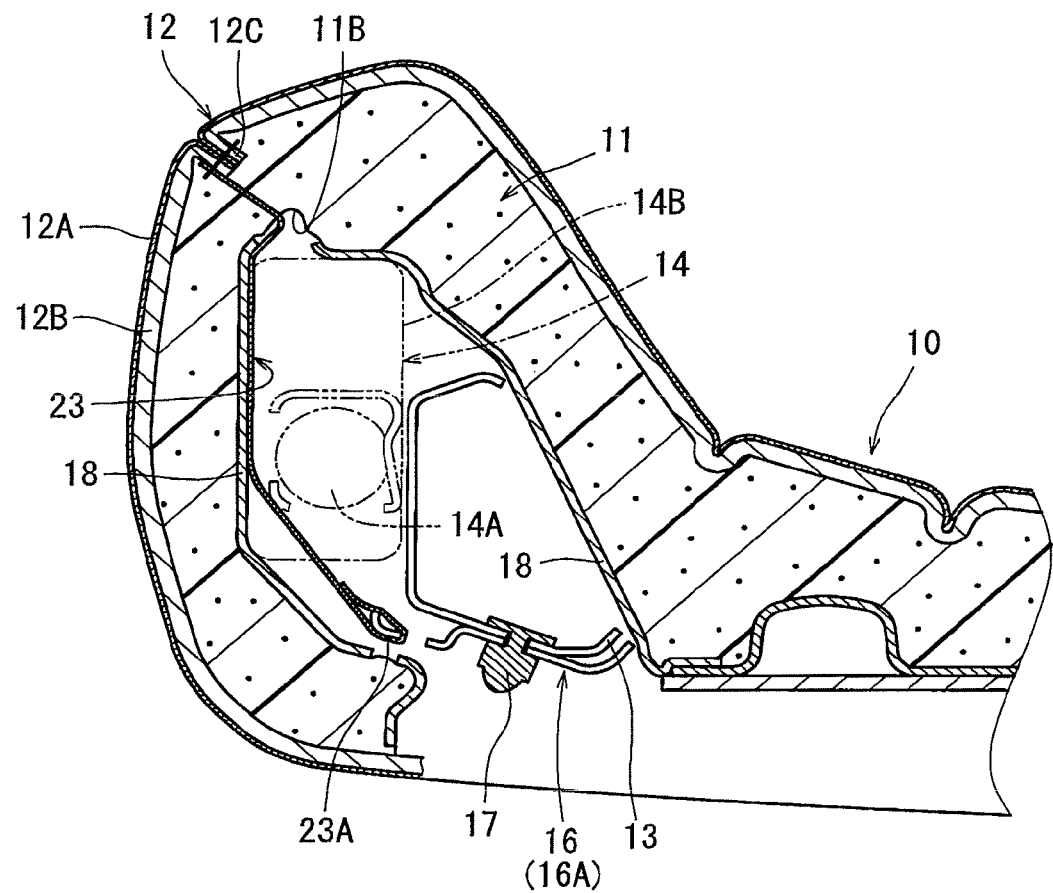
FIG. 9 is a cross-sectional view of the cushion pad assembly of FIG. 8 when the fastener is fastened to a seat frame.
Figure 10:
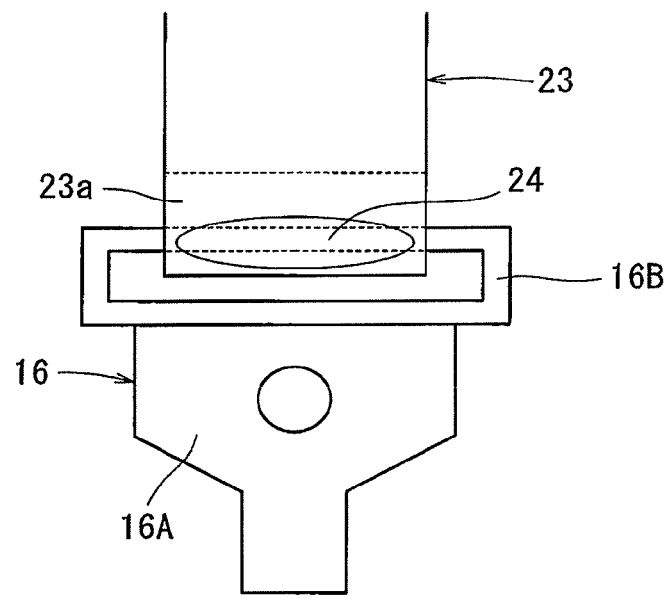
FIG. 10 is a plane view of the webbing and the fastener of FIG. 8.

As shown in FIG. 9, the cushion pad assembly 10 is mounted on the seatback frame 13. After that, the fastener 16 is detached from the retaining structure and attached to the seatback frame 13 by the bolt 17. The retaining structure is divided into a first portion and a second portion 24 shown in FIG. 10. The first portion remains on the cushion pad 11. As shown in FIG. 10, the second portion 24 remains on the webbing 23.

As shown in FIG. 10, the fastener 16 has a main body 16A and a connector 16B. As shown in FIG. 9, the main body 16A is attached to the seatback frame 13. As shown in FIG. 10, the connector 16B has a ring shape. A first end of the connector 16B is connected to the main body 16A. A second end of the connector 16B is connected to a fixation portion 23A of the webbing 23. The fixation portion 23A has a ring shape with a hole. The second end of the connector 16B is inserted into the hole of the fixation portion 23A.

As shown in FIG. 8, the retaining structure may retain the fastener 16 via the webbing 23. The retaining structure may indirectly retain the fastener 16. The foam material of the retaining structure may not be attached to the fastener 16. As shown in FIG. 10, it is possible that the second portion 24 of the retaining structure does not remain on the fastener 16 but does remain on the webbing 23. In this situation, the second portion 24 does not interfere with the attachment between the fastener 16 and the seatback frame 13.

Figure 11:
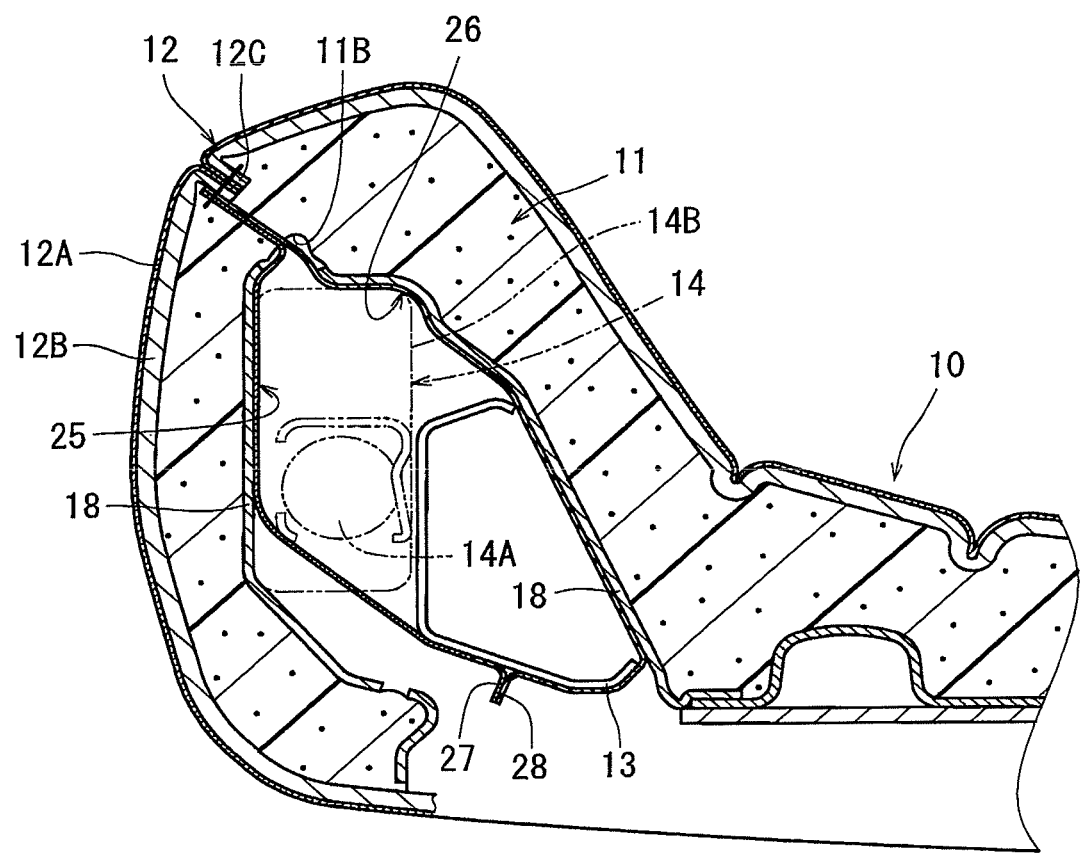
FIG. 11 is a cross-sectional view of the cushion pad assembly with the other webbing.

The cushion pad assembly 10 may have webbings 25 and 26 and fasteners 27 and 28 as shown in FIG. 11 instead of the webbing 15 and the fastener 16 shown in FIGS. 3 to 6. As shown in FIG. 11, the webbings 25 and 26 extend from the sewing portion 12C. The webbing 25 extends along an outside of the airbag module 14. The webbing 26 extends along an inside of the airbag module 14. The fasteners 27 and 28 are provided on tip ends of the webbings 25 and 26. The fasteners 27 and 28 may be a wire. The fasteners 27 and 28 are fastened each other. Thus, the webbings 25 and 26 are fastened to the seat cushion frame 13.

Figure 12:
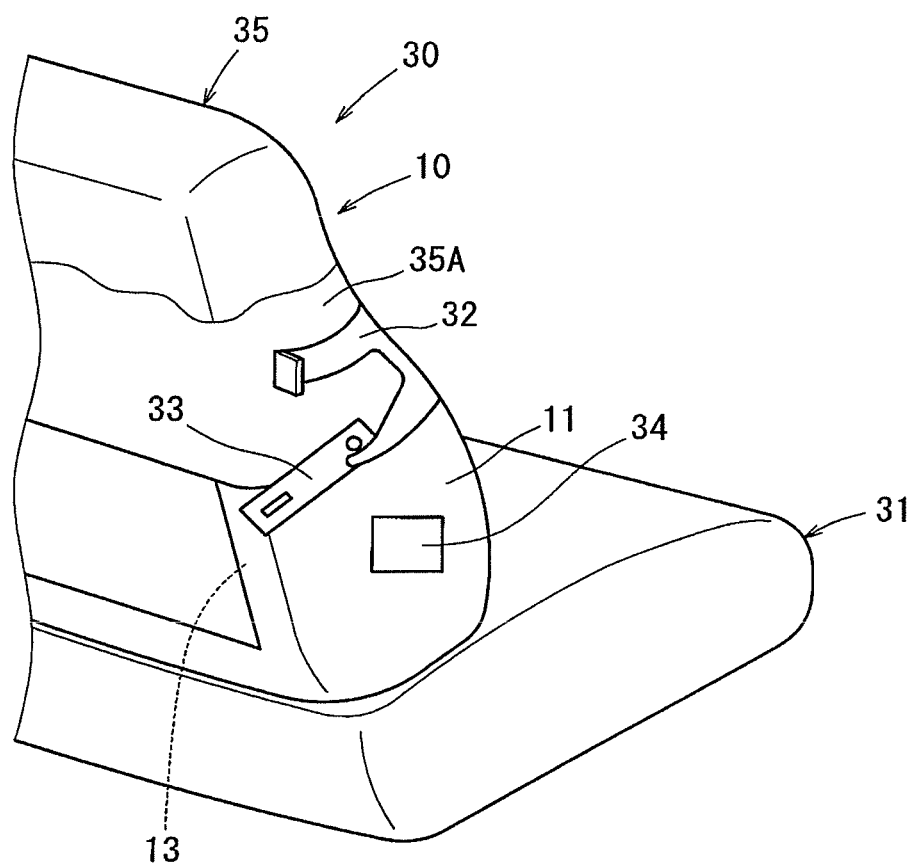
FIG. 12 is a perspective view of a vehicular seat having another configuration.

The cushion pad assembly 10 may have a seat skin 35 and a retaining structure 34 as shown in FIG. 12 instead of the seat skin 12 and the retaining structure shown in FIG. 3. As shown in FIG. 12, a seat has a seat back 30 and a seat cushion 31. The seat back 30 has the cushion pad assembly 10 including a seat skin 35 and the cushion pad 11. The seat skin 35 and the cushion pad 11 are preferably formed separately. The seat skin 35 covers the cushion pad 11. FIG. 12 shows a process of covering the cushion pad 11 by the seat skin 35.

As shown in FIG. 12, the seat skin 35 has a developing portion. Webbing 32 extends from the developing portion and extends along a back surface 35A of the seat skin. A fastener 33 is provided on a tip end of the webbing 32. The tip end of the webbing 32 or the fastener 33 is attached to the retaining structure 34. The retaining structure is provided on a front or side surface of the cushion pad 11. The retaining structure may detachably retain the webbing 32 or the fastener 33. The fastener 33 may be detached from the retaining structure, after the seat skin 35 covers the cushion pad 11. Afterwards, the fastener 33 may be fastened to the seatback frame 13.

The fastener may be a bracket (fastener 16) as shown in FIG. 3, a wire (fastener 27 or 28) as shown in FIG. 11, a bolt, a nut or the like.

The fastener may be fastened to the corresponding member, such as the frame 13 shown in FIG. 3, the fastener 27 or 28 shown in FIG. 11, a cushion pad or the like.

What is claimed is:

1. A vehicle seat comprising:
a cushion pad configured to cover a seat frame and to be attached to the seat frame;

a seat skin configured to cover the cushion pad, the seat skin provided with a developing portion to be developed by a developing force of an airbag;

a back surface member that is attached to a back surface of the cushion pad, which is opposite to a surface of the cushion pad covered by the seat skin;

a webbing connected to the seat skin so as to transmit the developing force of the airbag to the developing portion, the webbing extending from the developing portion of the seat skin and having a fixation portion;

a fastener provided at the fixation portion of the webbing; and a retaining structure configured to detachably retain the fastener at a predetermined position at the cushion pad before the fastener is fastened to a corresponding member.

2. The vehicle seat of claim 1, wherein the retaining structure is integrally provided with the cushion pad.

3. The vehicle seat of claim 1, wherein the seat skin is integrated with the cushion pad.

4. The vehicle seat of claim 1, wherein the retaining structure is configured to retain the webbing at the fixation portion so that the retaining structure retains the fastener via a portion of the cushion pad integrated with the webbing.

5. A manufacturing method of a vehicle seat,
the vehicle seat comprising:
  a cushion pad configured to cover a seat frame and to be attached to the seat frame;
  a seat skin configured to cover the cushion pad, the seat skin provided with a developing portion to be developed by a developing force of an airbag;
  a webbing connected to the seat skin so as to transmit the developing force of the airbag to the developing portion, the webbing extending from the seat skin and having a fixation portion;
  a fastener provided at the fixation portion of the webbing; and
  a retaining structure configured to retain the fastener at a predetermined position with respect to the cushion pad before the fastener is fastened to a corresponding member, the manufacturing method comprising:
  setting a back surface member in a mold for forming the cushion pad;
  foaming a foam material in the mold to form the cushion pad, and
  leaking a part of the foam material through a slit formed in the back surface member to form the retaining structure, the retaining structure firmly attaching a connection portion between the webbing and the fastener to the cushion pad.

6. A vehicle seat comprising:
a cushion pad configured to cover a seat frame and to be attached to the seat frame;

a seat skin configured to cover the cushion pad, the seat skin provided with a developing portion to be developed by a developing force of an airbag;

a webbing connected to the seat skin so as to transmit the developing force of the airbag to the developing portion, the webbing extending from the developing portion of the seat skin and having a fixation portion;

a fastener provided at the fixation portion of the webbing; and a retaining structure configured to detachably retain the fastener at a predetermined position at the cushion pad before the fastener is fastened to a corresponding member, wherein the retaining structure is configured to be divided when the fastener is detached from the retaining structure.

7. The vehicle seat of claim 6, wherein the retaining structure is made of a foam material.

8. The vehicle seat of claim 7, wherein the foam material is the same material as a foam material of the cushion pad.

9. The vehicle seat of claim 1, wherein the webbing is set on the back surface member.

10. The vehicle seat of claim 1, wherein the back surface member is provided with a slit that exposes a portion of the cushion pad, and wherein the fastener is detachably retained at the exposed portion of the cushion pad.

* * * * *